Patented June 10, 1941

2,245,541

UNITED STATES PATENT OFFICE 2,245,541

LEAD GLAZE

Raymond W. Goodwin, Cleveland Heights, Ohio, assignor to General Electric Company, a corporation of New York No Drawing. Application July 15, 1938,
Serial No. 219,414

8 Claims. (Cl. 106—49)

My invention relates to enamels and glazes for use, for example, in decorating glass articles such as the bulbs or envelopes for electric lamps.

One of the objects of my invention is to provide a single glaze or flux of such composition that a palette of colored enamels may be made by the addition of proper color oxides as mill additions. Another object is to provide a glaze having such a low fusion point that it can be applied to lead glass envelopes or bulbs and fired without deforming the envelopes, and such a coefficient of expansion that it can be applied to the inner surfaces of said envelopes without reducing their strength below a necessary minimum. Still another object is to produce lead glazes having clean bright colors.

One of the features of my invention is the use of small amounts of a nitrate, such as lithium nitrate, as a mill addition. High lead glazes are easily reduced and tend to produce dark or muddy colors. When small amounts of lithium nitrate are added to the mill batch, clean bright colors are obtained. Other nitrates which may be used are ammonium nitrate and sodium nitrate but the lithium salt is preferred.

Further features and advantages of my invention will appear from the following detailed description of species thereof.

According to my invention, a suitable glaze or flux, which I shall designate as No. 37, for use in the production of glass decorating enamels, has the following composition:

Calculated analysis of glaze No. 37.

| | Per cent |
|---|---|
| $SiO_2$ | 18.2 |
| PbO | 60.0 |
| $Al_2O_3$ | 0.9 |
| CdO | 6.0 |
| $Na_2O+K_2O$ | 0.7 |
| $B_2O_3$ | 14.0 |

The batch for said glaze No. 37 consists of the following:

| | Parts |
|---|---|
| Silica | 15 |
| Litharge | 56 |
| Feldspar | 5 |
| Lead nitrate | 6 |
| Cadmium oxide | 6 |
| Boric anhydride | 14 |

The batch materials are thoroughly mixed, smelted, quenched in water, dried and ground to pass a 100 mesh screen.

This glaze or flux composition may be used to produce a palette of colored enamels by the addition of proper color oxides as mill additions. By the use of this glaze white, ivory, yellow, red, orange, blue and green enamels have been made and applied to the inner surface of the tubular glass envelopes of electric lamps of the type shown in United States Patent 2,032,791, Paul O. Cartun. This list of colors may be extended by the use of the proper color oxides. The said glaze also has such a low fusion point that it can be applied to lead glass tubular envelopes and fired without deforming the envelopes, and such a coefficient of expansion that it can be applied to the inner surfaces of said envelopes without reducing their strength below a necessary minimum.

In order to fire the enamel to lead glass tubes without deforming the tube, a low fusing glaze is necessary. This has been obtained by a high content of lead oxide (at least about forty per cent) combined with the proper proportions of silica and boric oxide. A material increase in either silica or boric oxide at the expense of lead oxide tends to raise the fusion point.

The production of weak or brittle tubes is avoided by the use of a glaze having the proper coefficient of expansion, one which is preferably slightly lower than that of the glass to which it is applied. This is necessary in order that the glaze may be applied to the inner surface. This is accomplished by the use of boric oxide in amounts not to exceed fifteen per cent and by the avoidance of appreciable amounts of sodium and potassium oxides. However, for certain uses the boric oxide may be present in amounts as high as twenty-five per cent. Three per cent of alkali oxides may be used but when the sum of alkali oxides reaches five per cent, the tubes are noticeably weak to mechanical shock as measured by the ivory ball tester.

Feldspar has been used to introduce aluminum oxide, a constituent which has a favorable influence on the strength of the enamel and tends to produce a stronger tube when the enamel is fired on the inner surface.

Cadmium oxide is used to prevent blackening which ordinarily occurs when cadmium selenium sulphides or related materials are used with glazes containing lead oxide to produce red, yellow or orange enamels. Zinc oxide may also be used as a protective oxide in suitable composition but the colors tend to be darker than when cadmium oxide is used.

A feature of this invention is the use of small amounts of lithium nitrate as a mill addition. High lead glazes are easily reduced and tend to produce dark or muddy colors. When small amounts of lithium nitrate are added to the mill batch, clean bright colors are obtained. This has been definitely shown in white and yellow enamels. Other nitrates which may be used are ammonium nitrate and sodium nitrate, but better results have been obtained with the lithium salt.

It will be understood that the batch stated above is only representative and may be varied without materially changing the composition of the final enamel. For example, red lead or lead silicate may be used instead of litharge. Boric oxide may be furnished by the use of boric acid. A small amount of nitre may be used in place of lead nitrate. When red lead and nitre are used instead of litharge and lead nitrate, a flux is obtained which gives excellent shades of red with the usual red oxides, although it cannot be used with the ordinary yellow or orange oxides.

The above glaze No. 37 may be used not only for the production of various colored enamels by the use of proper color oxides, but in some cases at least the glaze may be used with various mill additions to obtain the same or similar colors. For instance, white may be produced by adding to said glaze No. 37 the necessary amount of zirconium oxide as "Opax," or suitable mixtures of Opax and tin oxide, or lead molybdate.

The standard glaze No. 37 may be slightly modified for special uses. In the production of white enamel, cadmium oxide is not necessary since no selenium or sulphur compounds are used as mill additions and therefore no reduction of lead occurs in firing. For use with white opacifiers, therefore, a simpler flux may be made with:

| | Parts |
|---|---|
| Silica | 15 |
| Feldspar | 5 |
| Litharge | 56 |
| Lead nitrate | 6 |

The calculated analysis of the glaze made from this batch is:

| | Per cent |
|---|---|
| $SiO_2$ | 22.75 |
| $Al_2O_3$ | 1.25 |
| PbO | 75.00 |
| $Na_2O + K_2O$ | 0.90 |

Tests have shown that this flux used with white opacifiers produces a white enamel having the proper fusion point and such a coefficient of expansion that lead glass tubes coated on the inside with this enamel have excellent resistance to mechanical shock.

Another suitable white glaze which I designate as No. 85, has the following calculated analysis:

| | Per cent |
|---|---|
| $SiO_2$ | 27.0 |
| PbO | 60.5 |
| $Al_2O_3$ | 1.0 |
| CdO | 4.0 |
| $As_2O_3$ | 2.0 |
| $Na_2O$ | 1.0 |
| $B_2O_3$ | 5.0 |

This glaze has a coefficient of expansion of 73.4 to $76.1 \times 10^{-7}$ cm. per cm. per degree centigrade at temperature of 100–200° C., and a melting point below 1400° C.

In all the above glazes, the silica is preferably present in an amount of about 15 to 30 per cent, while the boric oxide is preferably present in an amount of about 5 to 15 per cent. If desired, a portion of the lead in the above glazes may be replaced by about 5 to 15 per cent. of ZnO, in order to lower the expansion while maintaining a low melting point.

While the enamels described hereinbefore have been devised primarily for coating the inner surfaces of lamp bulbs, my invention also includes formulae for enamels of the same general type but which incorporate such necessary changes as to render them suitable for outside application to lime glass bulbs.

The particular features of these enamels are the combination of suitable physical properties such as low firing temperatures, proper coefficient of thermal expansion for outside application to lime glass bulbs, and sufficient resistance to weathering to permit outdoor use of the finished lamps. Listed below are the batch and calculated analyses of three enamels which are representative and which are classed as preferred compositions:

*Batch*

| | #19B | #21A | #24 |
|---|---|---|---|
| | Parts | Parts | Parts |
| Silica | 19.2 | 21.6 | 20.8 |
| Red lead | 46.0 | 54.5 | 51.3 |
| Feldspar | 5.0 | 5.0 | 5.0 |
| Fluorspar | 2.5 | 2.5 | 2.5 |
| Barium nitrate | 4.0 | 4.0 | 4.0 |
| Opax | 7.5 | 2.0 | 2.0 |
| Cadmium oxide | | | 5.0 |
| Lead titanate | 13.2 | 7.6 | 7.6 |
| Boric oxide | 5.0 | 5.0 | 5.0 |

*Calculated analyses*

| | #19B | #21A | #24 |
|---|---|---|---|
| | Percent | Percent | Percent |
| $SiO_2$ | 23.2 | 25.0 | 24.0 |
| PbO | 55.7 | 60.0 | 56.9 |
| $Al_2O_3$ | 1.0 | 1.0 | 1.0 |
| $CaF_2$ | 2.5 | 2.5 | 2.5 |
| BaO | 2.3 | 2.3 | 2.3 |
| $TiO_2$ | 3.5 | 2.0 | 2.0 |
| $ZrO_2$ | 6.8 | 1.8 | 1.8 |
| $Na_2O+K_2O$ | .5 | .5 | .5 |
| $B_2O_3$ | 5.0 | 5.0 | 5.0 |
| CdO | | | 5.0 |

Enamels #19B and 21A are white opaque enamels intended for outside white. The opacity is obtained by the inclusion of $TiO_2$ and $ZrO_2$ in what is essentially a lead borosilicate enamel. Additional opacity may be obtained by mill additions of opax or other opacifiers.

Enamel #24 contains CdO as a protective agent for use with mill additions of cadmium sulphides and cadmium selenium sulphides to obtain the colors from yellow through red.

Coefficients of thermal expansion are such that the enamels may be applied to the outside surfaces of lime glass bulbs. The melting points of these enamels are such that proper firing is obtained by placing bulbs in a furnace at 600° C. for three minutes. The entire range of colors may be obtained by the use of the enamels listed above and the addition of suitable color oxides.

What I claim as new and desire to secure by Letters Patent of the United States is:

1. A lead glaze comprising about forty to sixty per cent of lead oxide, fifteen to thirty per cent of silica, one per cent of aluminum oxide and a small amount not exceeding about three per cent of alkali oxides, said glaze having a firing temperature and coefficient of expansion adapting it for fusion to glass electric lamp envelopes.

2. A lead glaze comprising about forty to sixty per cent of lead oxide, fifteen to thirty per cent of silica, one per cent of aluminum oxide, five to fifteen per cent of boric oxide and a small amount not exceeding about three per cent of alkali oxides, said glaze having a firing temperature and coefficient of expansion adapting it for fusion to glass electric lamp envelopes.

3. A lead glaze having approximately the following composition:

| | Per cent |
|---|---|
| $SiO_2$ | 27.0 |
| PbO | 60.5 |
| $Al_2O_3$ | 1.0 |
| CdO | 4.0 |
| $As_2O_3$ | 2.0 |
| $Na_2O$ | 1.0 |
| $B_2O_3$ | 5.0 |

4. A lead glaze having approximately the following composition:

| | Per cent |
|---|---|
| $SiO_2$ | 18.2 |
| PbO | 60.0 |
| $Al_2O_3$ | 0.9 |
| CdO | 6.0 |
| $Na_2O+K_2O$ | 0.7 |
| $B_2O_3$ | 14.0 |

5. A lead glaze having approximately the following composition:

| | Per cent |
|---|---|
| $SiO_2$ | 23-25 |
| PbO | 55-60 |
| $Al_2O_3$ | 1 |
| $CaF_2$ | 2.5 |
| BaO | 2.3 |
| $TiO_2$ | 2-3.5 |
| $ZrO_2$ | 1.5-7 |
| $Na_2O+K_2O$ | 0.5 |
| $B_2O_3$ | 5 |

6. A lead glaze comprising about 40–75 per cent of lead oxide, 15–30 per cent of silica, 5–15 per cent of boric oxide and a small amount less than 5 per cent alkali oxides, said glaze having a firing temperature and coefficient of expansion adapting it for fusion to glass electric lamp envelopes.

7. A lead glaze comprising about 18–27 per cent silica, 55–60 per cent lead oxide, one per cent aluminum oxide, 0–6 per cent cadmium oxide, 5–14 per cent boric oxide and less than three per cent alkali oxides.

8. A lead glaze comprising about 18–27 per cent silica, 55–60 per cent lead oxide, one per cent aluminum oxide, 4–6 per cent cadmium oxide, 0–2 per cent arsenic oxide, 5–14 per cent boric oxide and less than three per cent alkali oxides.

RAYMOND W. GOODWIN.